(12) United States Patent
Rinker

(10) Patent No.: US 8,086,635 B1
(45) Date of Patent: Dec. 27, 2011

(54) COMPLIANCE MONITORING

(75) Inventor: James Howard Rinker, Sterling, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 788 days.

(21) Appl. No.: 11/425,255

(22) Filed: Jun. 20, 2006

(51) Int. Cl.
*G06F 7/00* (2006.01)
*G06F 17/30* (2006.01)

(52) U.S. Cl. .................................... 707/783
(58) Field of Classification Search .................. 707/783
See application file for complete search history.

(56) References Cited

U.S. PATENT DOCUMENTS

| | | | |
|---|---|---|---|
| 2001/0007133 A1* | 7/2001 | Moriconi et al. | 713/201 |
| 2004/0024764 A1* | 2/2004 | Hsu et al. | 707/9 |
| 2004/0117358 A1* | 6/2004 | von Kaenel et al. | 707/3 |
| 2005/0035863 A1* | 2/2005 | Nelson | 340/573.1 |
| 2007/0180490 A1* | 8/2007 | Renzi et al. | 726/1 |

* cited by examiner

*Primary Examiner* — Hosain Alam
*Assistant Examiner* — Van Oberly

(57) ABSTRACT

A managed service may include a device configured to receive a request for access information and to send the access information to a reviewer based on the request. The managed service may receive input information from the reviewer, where the input information reflects changes to the access information and may update the access information based on the input information. The managed service may produce a report related to the updated access information, where the report is configured to reflect actions performed by the reviewer with respect to the access information and where the reviewer's actions are related to a compliance policy.

21 Claims, 16 Drawing Sheets

400

| USER ID 410 | | 430 | USER CONTACT INFORMATION 420 | 440 |
|---|---|---|---|---|
| MANAGER ID | | | MANAGER CONTACT INFORMATION | |

| SYSTEM ID 450 | RIGHTS 460 | SECURITY LEVEL 470 | DESCRIPTION 480 | COMMENTS 490 |
|---|---|---|---|---|
| FINANCE | FIN1A1 | 4 | FINANCE SYS 1A | FULL ACCESS |
| CONTRACTS | ADMIN | 4 | CON SERVER | ALL PRIVILEGES |
| SECURITY | USERAB | 1 | FACILITY SECUR | USER READ ONLY |
| ⋮ | ⋮ | ⋮ | ⋮ | |
| CORPORATE | CORP-R/W | 3 | MAIN CORP SYS | R/W FOR TESTING |

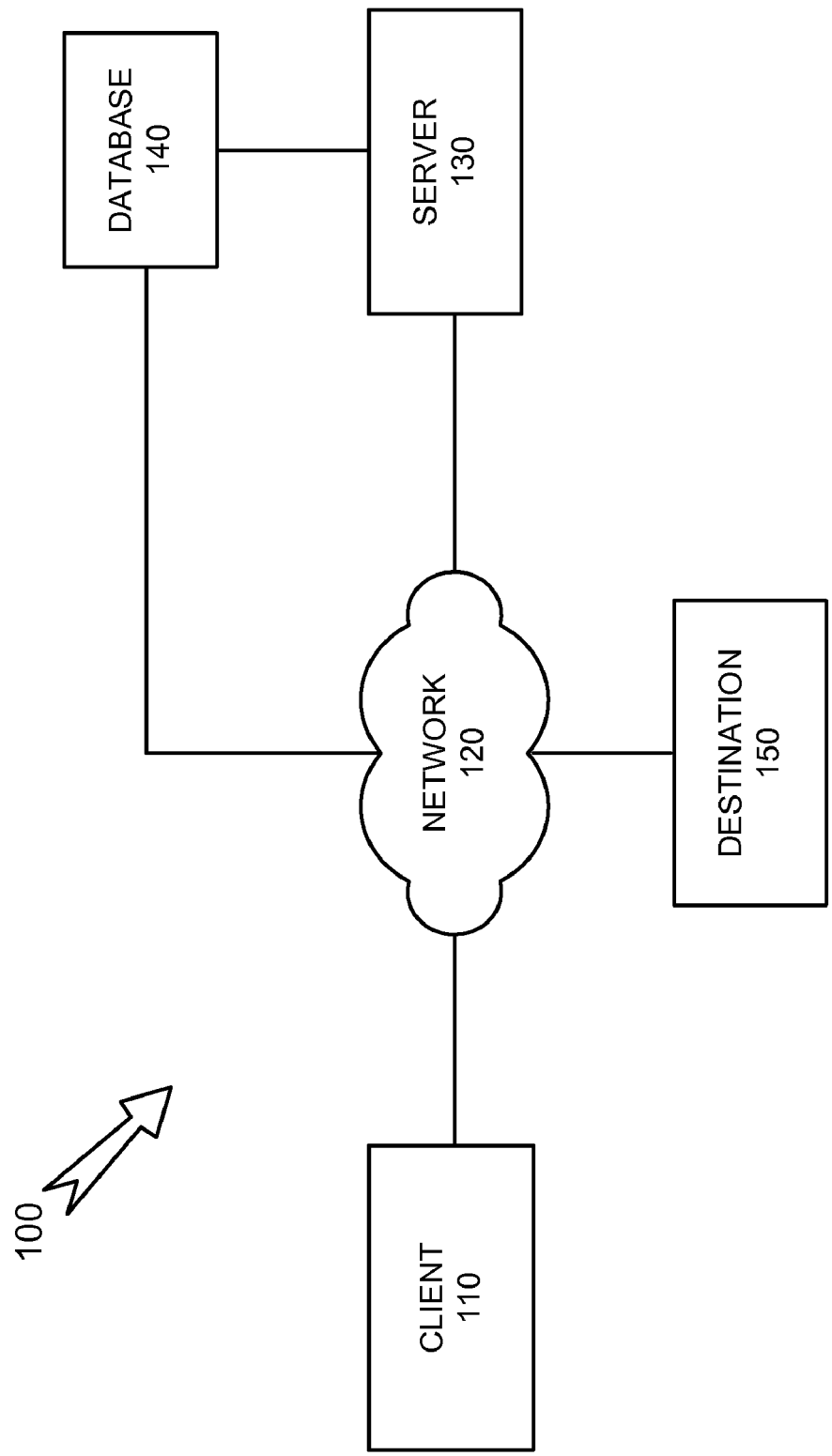

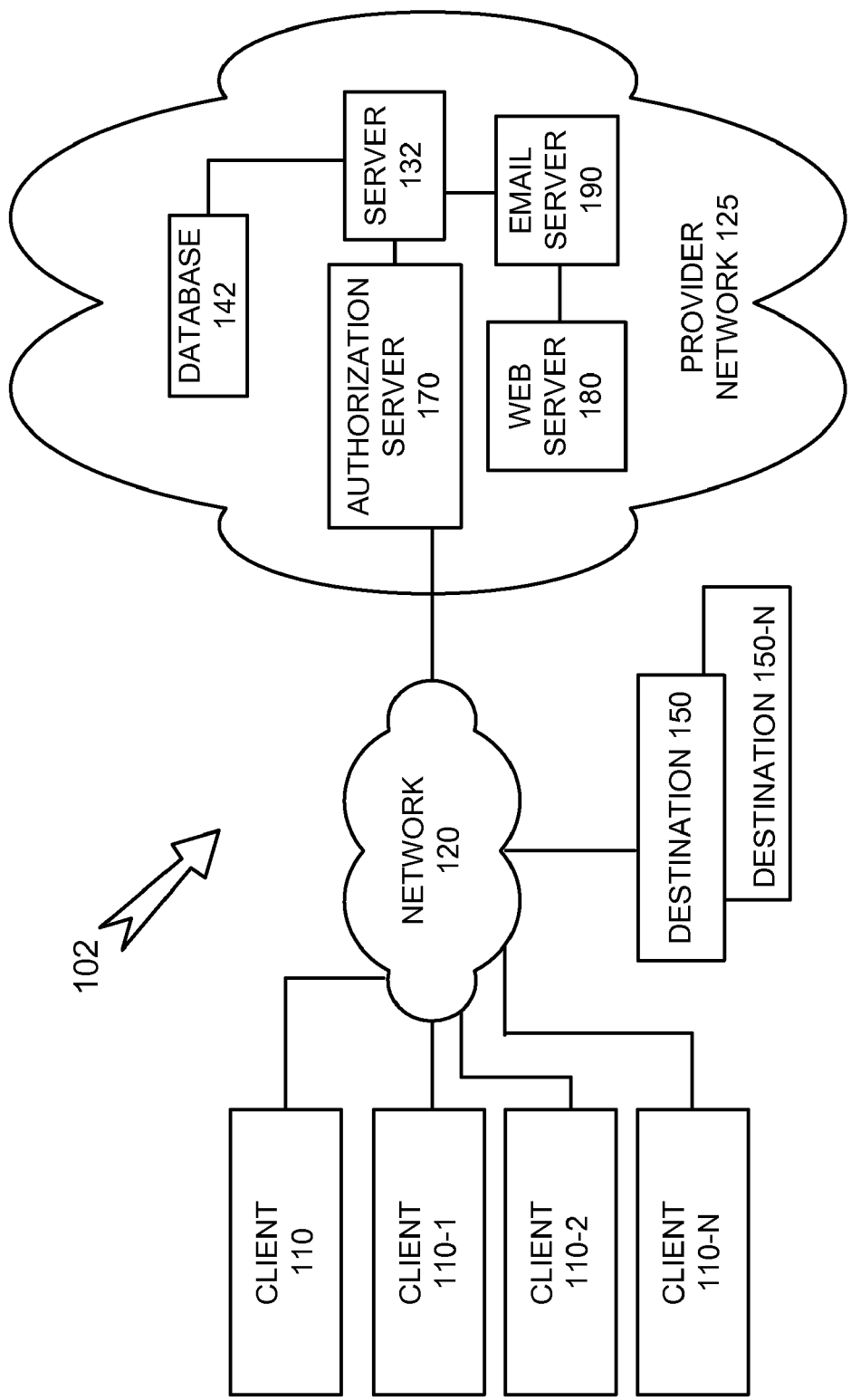

| USER ID | | | | |
|---|---|---|---|---|
| MANAGER ID | | | | |
| USER CONTACT INFORMATION | | | | |
| MANAGER CONTACT INFORMATION | | | | |
| SYSTEM ID | RIGHTS | SECURITY LEVEL | DESCRIPTION | COMMENTS |
| FINANCE | FIN1A1 | 4 | FINANCE SYS 1A | FULL ACCESS |
| CONTRACTS | ADMIN | 4 | CON SERVER | ALL PRIVILEGES |
| SECURITY | USERAB | 1 | FACILITY SECUR | USER READ ONLY |
| ▪▪▪ | ▪▪▪ | ▪▪▪ | ▪▪▪ | |
| CORPORATE | CORP-R/W | 3 | MAIN CORP SYS | R/W FOR TESTING |

FIG. 4

| SYSTEM ID | RIGHTS | SECURITY LEVEL | STATUS | REVIEWED | LINK | AUTHORIZATION DATE/TIME |
|---|---|---|---|---|---|---|
| FINANCE | FIN1A1 | 4 | NEW | YES | L-1 | 5/14/06 0700 |
| FINANCE | ADMIN | 4 | UPDATED | YES | L-2 | 5/14/06 0710 |
| SECURITY | USERAB | 1 | DELETED | YES | L-3 | 5/20/06 1400 |
| ■ ■ ■ | ■ ■ ■ | ■ ■ ■ | ■ ■ ■ | ■ ■ ■ | ■ ■ ■ | ■ ■ ■ |
| CORPORATE | CORP-R/W | 3 | UPDATED | NO | L-4 | N/A |

FIG. 5

SECURITY MANAGEMENT SYSTEM
UNAUTHORIZED USE OF THIS SYSTEM IS PROHIBITED

| SEARCH USER | REPORTS | BATCH PROCESSES | EMAIL SETUP |

SYSTEM ▽        SELECT USER ▽

NAME:                           MANAGER:
JOB TITLE:                      MANAGER'S TITLE:
EMAIL:                          MANAGER'S EMAIL:

EMAIL TO ADDRESSES:
                                LIVE ⊙        TEST ⊙

USER REVIEWED                   REVOKE ALL PRIVILEGES

| NAME: | SYSTEM: | RIGHTS: | DESCRIPTION: | COMMENTS: | SECURITY LEVEL: |
|---|---|---|---|---|---|
| D. DOE | FINANCE | F1N1A1 | FINANCE SYS 1A | FULL ACCESS | 4 |
| D. DOE | SECURITY | S007 | GOVT PURC DBASE | USER RIGHTS | 1 |
| D. DOE | PURCHASE | BUYER-1 | ADMIN-PUR SYS | ASST. MANAGER | 3 |

DROP  DROP  DROP

FIG. 7

AUDIT REPORT FOR BILL SMITH — 1100

| AUTHORIZATION DATE/TIME (570) | AUTHORIZED BY (1120) | AUTHORIZED (920) | SYSTEM ID (450) | SECURITY LEVEL (470) |
|---|---|---|---|---|
| 5/20/06 0600 | R.CHARLES | YES | FINANCE1 | 1 |
| 5/20/06 0633 | R.CHARLES | NO | CONTRACTS | N/A |
| 5/22/06 1200 | R.CHARLES | YES | CORPORATE | 4 |

| PRIVILEGE DATE (1130) | PRIVILEGES (1140) | DESCRIPTION (480) | NOTE (1150) |
|---|---|---|---|
| 1/03/06 | FULL SYSTEM ADMIN | READ/WRITE/MODIFY PRIVILEGES | VERY RESTRICTED PRIVILEGE |
| 1/03/06 | NONE: REVOKED | N/A | N/A |
| 3/31/06 | USER, READ ONLY | READ | LOWEST PRIVILEGE |

FIG. 11

COMPLIANCE MONITORING

BACKGROUND OF THE INVENTION

Entities, such as corporation, may use systems that cannot be accessed unless users are authorized. For example, a corporation may have a server that contains corporate financial data. Access to the server may be restricted to persons that have a need to access financial data and that are authorized to access the financial data via a corporate network.

One or more network administrators may be responsible for providing authorization information to users so that the users can access protected data, such as financial data. Companies may wish to perform periodic audits of systems that include protected data (e.g., financial data) and/or users that access these systems. For example, a company may wish to perform quarterly audits to ensure that only persons with an ongoing need to access protected data can do so. Certain individuals, such as managers, may need to determine whether the users have a continued need to access the protected systems. These individuals may find it difficult and/or time consuming to make accurate determinations with respect to users' access needs and/or rights when a large number of users and/or protected systems are involved. As a result, performing accurate audits of protected systems and/or of users having access to these systems may be very costly to entities that use protected systems.

BRIEF DESCRIPTION OF THE DRAWINGS

The accompanying drawings, which are incorporated in and constitute a part of this specification, illustrate one or more embodiments of the invention and, together with the description, explain the invention. In the drawings, FIG. 1A illustrates an exemplary system that can be configured to operate in accordance with principles of the invention;

FIG. 1B illustrates an alternative exemplary system that can be configured to operate in accordance with principles of the invention;

FIG. 4 illustrates an exemplary data structure to store information related to a user consistent with principles of the invention;

FIG. 5 illustrates an exemplary data structure to store information related to a review of a user or a protected system consistent with principles of the invention;

FIG. 7 illustrates an exemplary user interface to display information related to reviewing a user consistent with principles of the invention;

FIG. 11 illustrates an exemplary audit report consistent with principles of the invention;

DETAILED DESCRIPTION OF PREFERRED EMBODIMENTS

Figure 2:
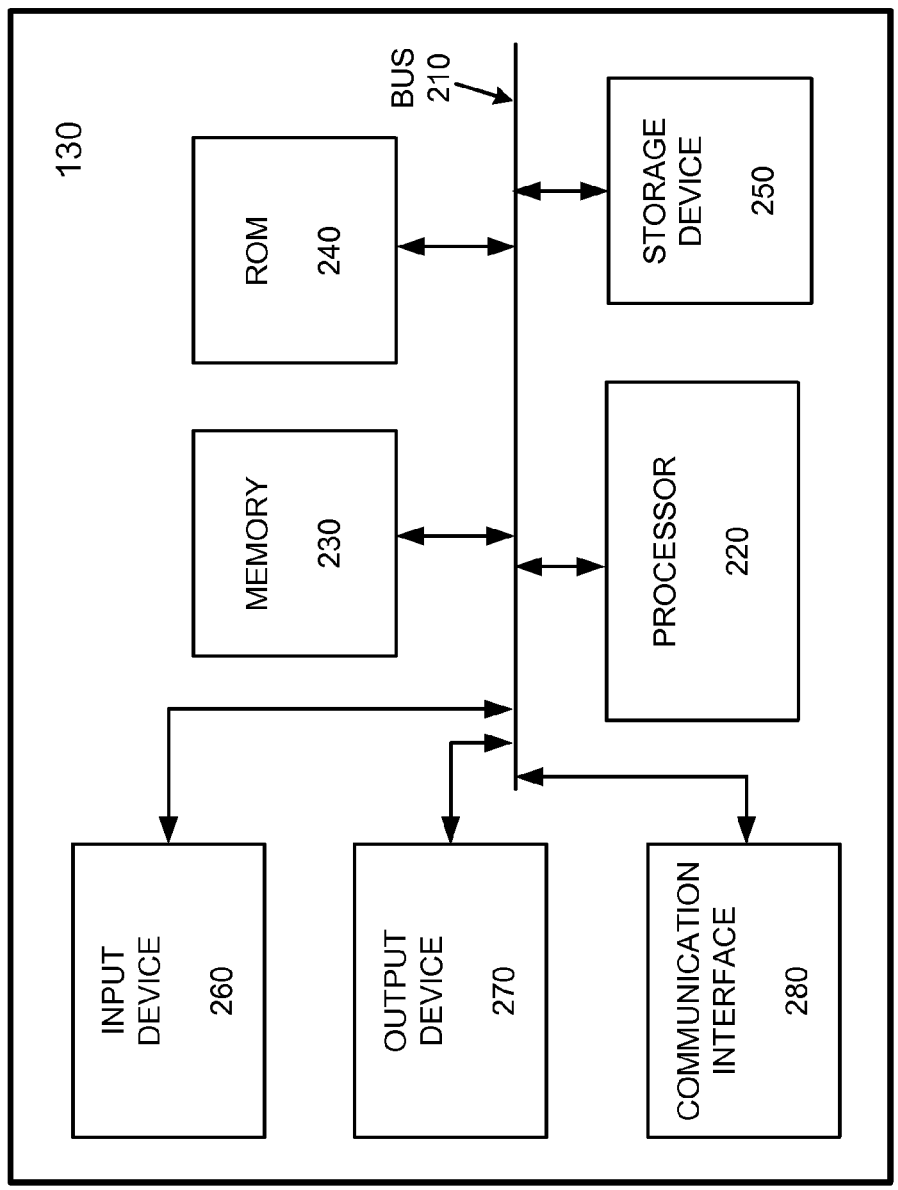
FIG. 2 illustrates an exemplary architecture for implementing the server of FIG. 1 consistent with principles of the invention.

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may facilitate maintaining and reviewing policies within a networked environment. For example, an entity may have access policies for protected systems that contain sensitive information, such as medical records, financial information, personal identifiers, etc. The entity may need to account for individuals and/or devices that have access to these protected systems to comply with internal procedures and/or government mandated procedures. An implementation may maintain a database that contains information about users and protected systems that the users can access. The implementation may allow a reviewer to perform periodic reviews of users and/or protected systems in accordance with a policy.

The reviewer may determine whether a user should continue to have access to a protected system, should have his/her access rights modified (e.g., upgraded or downgraded), and/or should have his/her access rights terminated. The reviewer may make these determinations based on one or more criteria. The reviewer may annotate a record related to the user and/or a protected system with information that indicates that the user was reviewed, a date and/or time when the review was performed, and/or an outcome of the review. Implementations may allow the reviewer to send messages to the user and or individuals related to the user, such as the user's manager, to determine whether the user requires continued access to a protected system and/or to notify the user and manager about a result of the review.

An implementation may be configured to allow an auditor to access information related to the review, such as an audit report, to determine whether a review was performed with respect to one or more users and/or protected systems. The implementation may further provide the auditor with information that indicates whether a review complies with one or more policies, such as corporate and/or government mandated policies pertaining to the access of protected systems.

Implementations may be implemented via a standalone system, e.g., via a system on the premises of a corporation performing an access review on its own behalf, and/or as a managed service. In a managed service implementation, a service provider may provide a managed service to a customer, where the managed service includes access review and/or auditing functionality. For example, a service provider may provide network access review and auditing functions to a corporate customer on a monthly subscription basis. The service provider may maintain and operate equipment and/or code that are used by the customer to perform reviews and/or audits of the customer's network access policies.

As used herein, "user" may refer to an individual that has an access privilege related to a protected system. A user may be identified with a device (e.g., a client device), a group (e.g., a department), etc. "Protected system" or "protected device" may refer to a system/device that is accessed, in whole or in part, in cooperation with access privileges, such as user authorizations. User authorizations may include passwords, biometric identifiers, and/or other information that can be used to identify an individual and/or to make a determination with respect to an individual. "Access privileges" may include permissions that allow a user to access portions of a protected device and to perform operations (e.g., read and/or write operations) with respect to the protected device.

As used herein, "reviewer" may refer to an individual that performs a review with respect to a user and/or protected system. A reviewer may perform a review to determine whether access privileges related to a user and/or protected system should be created, modified, and/or terminated. The reviewer may perform a review and/or may produce compliance information, such as compliance results, in accordance with one or more procedures, such as compliance procedures.

As used herein, "auditor" may refer to an individual that performs an audit related to users, reviewers, and/or protected systems. An auditor may receive information that is related to one or more user access policies and/or protected systems. The auditor may perform an audit in accordance with a procedure, such as an audit and/or compliance procedure. Audit and/or compliance procedures may be mandated by an individual, an entity, a government, etc.

Exemplary System

FIG. 1A illustrates an exemplary system that can be configured to operate in accordance with the principles of the invention. System 100 may include a client 110, a network 120, a server 130, database 140, and a destination 150.

Client 110 may include a device capable of sending information to a destination. For example, client 110 may include a plain old telephone system (POTS) device, a web-enabled cellular telephone, an Internet protocol (IP) telephone, a computer, such as a desktop computer, a laptop computer, a client, a server, a personal digital assistant (PDA), or another computation or communication device.

Network 120 may include any network capable of transferring information. Implementations of network 120 may include public switched telephone networks (PSTNs), local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), etc. Network 120 may include network devices, such as routers, switches, firewalls, gateways, and/or servers (not shown). Network 120 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

Server 130 may include a device capable of receiving information from, and transmitting information to, another device and/or network. For example, server 130 may include a workstation, desktop computer, laptop computer, PDA, web enabled cellular telephone, Wi-Fi device, or another type of network device. Server 130 may be configured to run applications, such as server applications, database applications, email applications, reporting applications, and communications applications.

In one implementation, server 130 may provide a service to other devices in system 100, such as client 110 and/or destination 150. For example, server 130 may operate with database 140 to maintain authorization information about clients 110, where the authorization information is used to allow clients 110 to communicate with destination 150 when clients 110 are authorized to do so. Server 130 may further perform reviews of client 110 with respect to a protected system, such as destination 150, to determine whether client 110 can access destination 150 according to a policy, such as a network security policy.

Database 140 may include hardware or software based logic to store information. For example, database 140 may store information about clients 110, persons operating one or more clients 110, devices or directories that can be accessed by clients 110, authorization information related to clients 110 and/or operators of clients 110, security levels associated with clients 110, audit information related to clients 110 and/or destination 150, etc. In an implementation, database 140 may include a data structure residing on a storage device, such as a hard disk. Database 140 may reside in server 130 and/or may be remote with respect to server 130.

Destination 150 may include a device capable of sending information to a network or receiving information from a network. Destination 150 may include a computer, such as a desktop computer, a laptop computer, a client, a server, a personal digital assistant (PDA), a web-enabled cellular telephone, or another computation or communication device. In one implementation, destination 150 may be a protected device, and access to destination 150 may be managed via server 130. Access to destination 150 may be restricted so that only authorized users (i.e., users with permission) can access destination 150.

In an implementation, destination 150 may include a server (protected device) that contains controlled information. "Controlled information," as used herein, refers to information that is maintained subject to parameters, such as access parameters, that are used to prevent unauthorized devices and/or individuals from accessing the controlled information. Authorization devices, such as passwords, biometric techniques (e.g., retinal, voice and/or fingerprint scans), etc. may be used, alone or in combination with other devices and/or techniques to limit access to controlled information. Examples of controlled information are, but are not limited to, financial, customer, employee, medical, intelligence, security, geographic and/or logistic information.

In the implementation of FIG. 1A, client 110, server 130 and/or destination 150 may be devices related to a single entity, such as a corporation, government agency, educational institution, hospital, etc. In other implementations, a server may be related to a first entity, such as a service provider, and a client and/or destination may be related to a second entity, such as a customer and/or subscriber.

FIG. 1B illustrates an alternative exemplary system 102 that can be configured to operate in accordance with principles of the invention. System 102, of FIG. 1B, may include one or more clients 110, 110-1, 110-2, and 110-N, network 120, provider network 125 that includes server 132, database 142, authorization server 170, web server 180, and email server 190, and destinations 150 and 150-N. Clients 110, 110-1, 110-2 and 110-N and network 120 may be similar to client 110 and network 120, respectively, of FIG. 1A.

Provider network 125 may include a network that allows communication among devices related to a service provider.

For example, provider network 125 may be a LAN that is used by a service provider to make managed services available to one or more customers, such as clients 110, 110-1, 110-2 and/or 110-N.

Server 132 may include a device capable of receiving information from, and transmitting information to, another device and/or network. Server 132 may be similar to server 130 of FIG. 1A and may operate with database 142, authorization server 170, web server 180, and email server 190 to provide managed services to clients 110 to 110-N. Implementations of server 132 may operate on information related to a number of clients 110 to 110-N simultaneously when providing services thereto.

Database 142 may include hardware or software based logic to store information related to a number of clients 110 to 110-N. In an implementation, database 142 may be similar to database 140 of FIG. 1A. Destinations 150 and 150-N may be similar to destination 150 of FIG. 1A. In an implementation, destination 150 may be related to a first customer, such as client 110, and destination 150-N may be related to another customer, such as client 110-N.

Authorization server 170 may include a device to identify clients 110 to 110-N and/or parties related to clients 110-110-N. Authorization server 170 may store client identifiers, such as user names and/or passwords. Authorization server 170 may compare information received from clients 110 to 110-N to information stored in authorization server 170 to determine whether clients 110 to 110-N are authorized to use managed services provided via server 132.

Web server 180 may include hardware or software based logic to host web pages and/or to serve the web pages to customers, such as clients 110 to 110-N. Web server 180 may serve the web pages to clients 110 to 110-N via hypertext transfer protocol (http), extensible markup language (XML), etc. Web server 180 may provide content to clients 110 to 110-N that renders user-side interfaces to allow operators, such as reviewers, to receive information from server 132 and to provide inputs to server 132 when performing reviews and/or audits of network access policies.

Email server 190 may include hardware or software based logic to generate, send, and/or receive messages on behalf of clients 110 to 110-N, server 132, and/or destinations 150 and 150-N. Email server 190 may include a simple mail transfer protocol (SMTP) server to send email messages to one or more destinations on behalf of clients 110 to 110-N, server 132, and/or destinations 150 and 150-N.

Exemplary Server Architecture

FIG. 2 illustrates an exemplary architecture for implementing server 130 and/or 132 consistent with the principles of the invention. It will be appreciated that clients 110 to 110-N, destinations 150, 150-N, and/or other devices (not shown) that can be used in system 100 may be similarly configured. As illustrated in FIG. 2, server 130/132 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130/132. Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit server 130/132 to accept information from an operator, such as a system administrator, via devices, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130/132 to communicate with other devices and/or systems, such as client 110 and/or destination 150. For example, communication interface 280 may include a modem, an Ethernet interface, and/or a port. Alternatively, communication interface 280 may include other mechanisms for communicating via a network, such as network 120.

Server 130/132 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Exemplary Functional Diagram

Figure 3A:
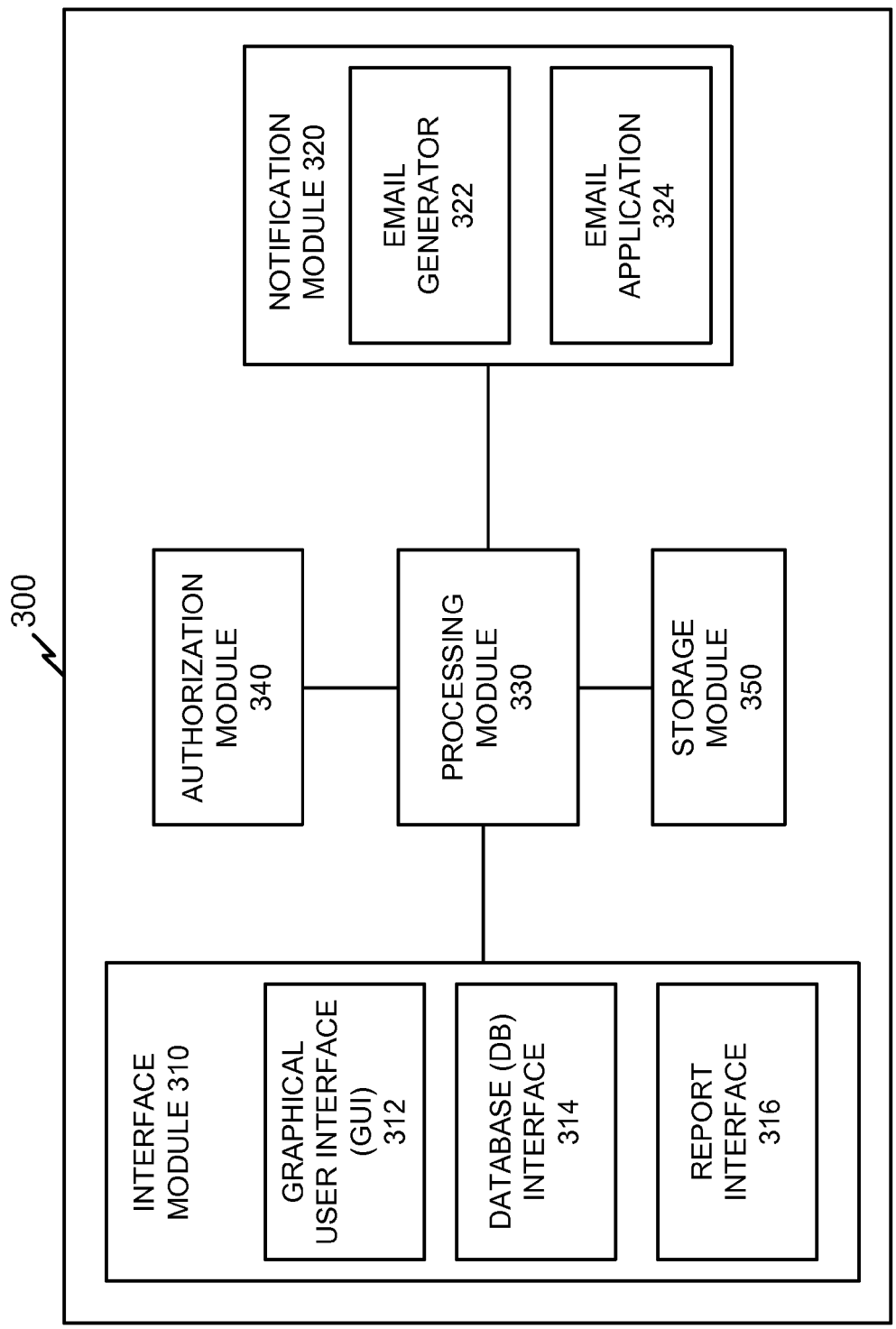
FIG. 3A illustrates an exemplary functional diagram of the server of FIG. 1A consistent with principles of the invention.

FIG. 3A illustrates an exemplary functional diagram of server 130 consistent with the principles of the invention. Server 130 may implement hardware or software based logic to operate as an authorization, review, and/or audit device. Implementations of server 130 may operate on behalf of devices on network 120, such as destination 150, and may manage authorization information related to devices and/or individuals that have access to controlled information on destination 150.

An implementation of server 130 is illustrated via diagram 300 and may include an interface module 310, a notification module 320, a processing module 330, an authorization module 340, and a storage module 350.

Interface module 310 may include hardware or software based logic to send and/or receive information. Interface module 310 may include a graphical user interface (GUI) 312, a database interface (DB) 314, and/or a report interface 316.

GUI 312 may include hardware or software based logic to provide information to a user of server 130 and/or to receive information from a user of server 130 (e.g., via a touch sensitive display device). GUI 312 may include a web browser to render information to a display device, such as output device 270.

DB interface 314 may include hardware or software based logic to send information to and/or to receive information from database 140 and/or other databases operating on server 130 and/or in system 100. DB interface 314 may read information from database 140 based on an operator input received via input device 260 and/or may write information to database 140 based on instructions received from processing module 330.

Report interface 316 may include hardware or software based logic to produce a report. For example, report interface 316 may produce a report based on information related to a review of a protected system (e.g., destination 150) and/or an individual (e.g., a user of destination 150 or client 110). A report may include information, such as an identity of a user, a destination identifier, access privileges, dates and/or times when certain actions were performed (e.g., file creation, a review/authorization of a system or individual, etc.), links to destinations and/or other information, compliance results, etc. Report interface 316 may generate electronic reports and/or hardcopy reports.

Notification module 320 may include hardware or software based logic to send and/or receive notifications, such as email messages. For example, notification module 320 may send a notification to a device and/or individual and/or may receive a notification from a device and/or individual. Notification module 320 may include email generator 322 and/or email application 324.

Email generator 322 may include hardware or software based logic to generate one or more messages based on instructions received from processing module 330, a reviewer, and/or another device or individual related to system 100. In an implementation, email generator 322 may generate an email message that is related to a review performed with respect to a protected device and/or a user of the protected device.

Email application 324 may include hardware or software based logic to send a message to a destination and/or to receive a message. In an implementation, email application 324 may receive an email message from email generator 322 and may send the email message to a destination. Implementations of email application 324 may be configured to accept attachments, such as a file that includes an audit report that may include the results of a review performed on behalf of a protected device.

Processing module 330 may include hardware software based logic to process instructions related to maintaining review/authorization information, evaluating review/authorization information and/or updating review/authorization information on behalf of authorization module 340. Processing module 330 may further perform operations on behalf of interface module 310 and/or notification module 320. Processing module 330 may be implemented in a standalone or distributed configuration, such as by being distributed across one or more devices.

Authorization module 340 may include hardware or software based logic to determine whether a user or device is authorized to access a destination, such as a protected system. Authorization module 340 may operate with authorization devices and/or mechanisms, such as passwords, biometrics, and/or other identifiers, to establish an identity of a user or device. Authorization module 340 may use authorization mechanisms to provide access to portions of a protected device and/or an entire protected device. Implementations of authorization module 340 may operate with encrypted and/or unencrypted information when authorizing a user or device.

Storage module 350 may include hardware or software based logic to store information related to users, devices operated by users, protected devices, reviewers, auditors, and/or results of a review/audit. Storage module 350 may be implemented in server 130 and/or may be located remotely with respect to server 130 and connected thereto via a link. In an implementation, storage module 350 may be implemented in memory 230, ROM 240 and/or storage device 250.

Figure 3B:
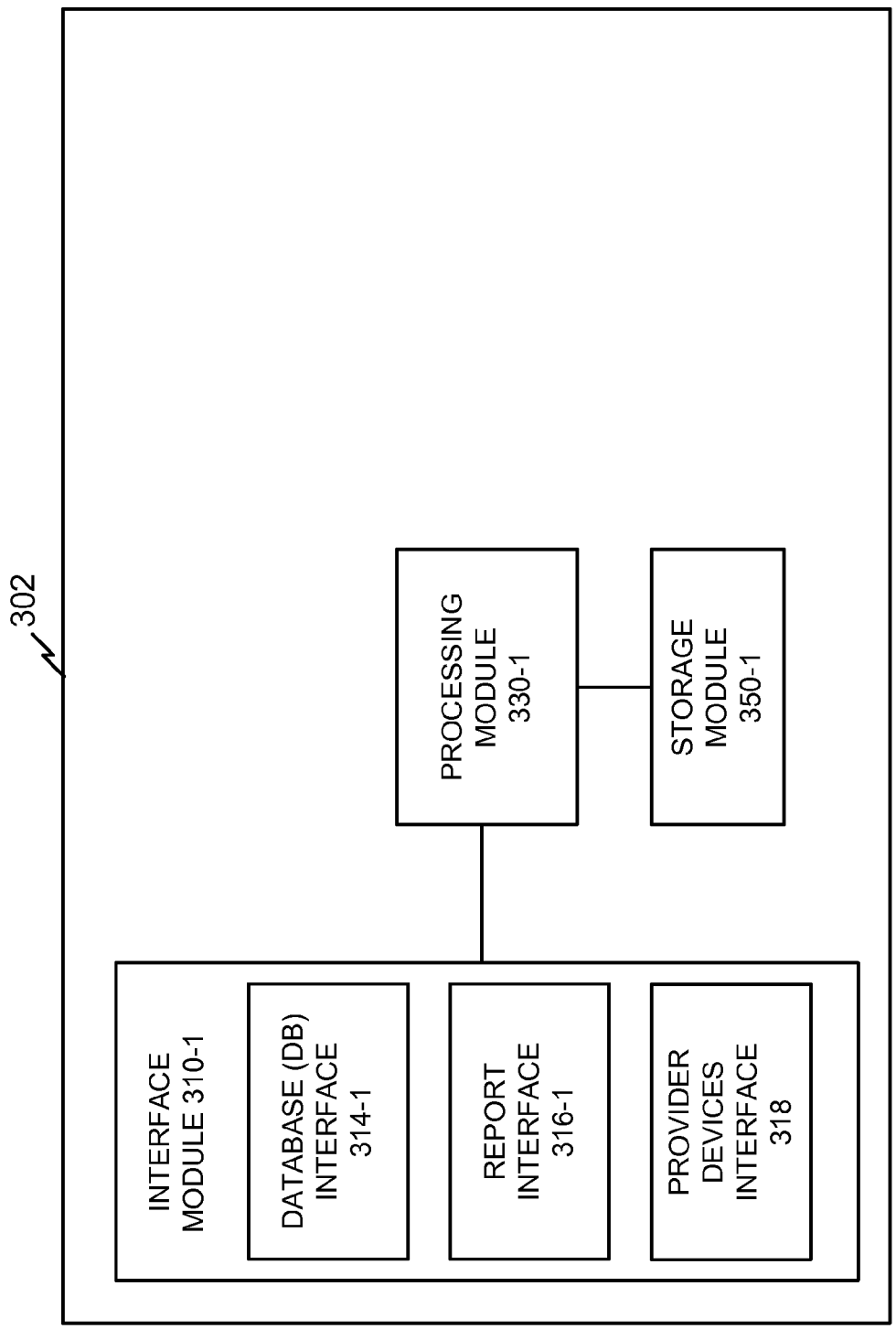
FIG. 3B illustrates an exemplary functional diagram of the server of FIG. 1B consistent with principles of the invention.

FIG. 3B illustrates an exemplary functional diagram 302 of server 132 consistent with principles of the invention. Diagram 302 may include interface module 310-1, DB interface 314-1, report interface 316-1, provider devices interface 318, processing module 330-1, and storage module 350-1. Interface module 310-1, DB interface 314-1, report interface 316-1, processing module 330-1, and storage module 350-1 may be similar to interface module 310, DB interface 314, report interface 316, processing module 330, and storage module 350 of FIG. 3A.

Provider devices interface 318 may include hardware or software based logic to allow server 132 to communicate with other devices used in provider network 125, such as authorization server 170, web server 180, and/or email server 190. Provider devices interface 318 may include logic to perform data and/or protocol conversions to allow server 132 to communicate with other devices operating in provider network 125.

Exemplary Data Structures

FIG. 4 illustrates an exemplary data structure to store information related to a user consistent with principles of the invention. Implementations of server 130/132 may operate with one or more data structures 400 when maintaining and/or manipulating information. Data structure 400 may include information arranged in a row by column format to facilitate use by an individual, such as a reviewer or auditor.

An implementation of data structure 400 can include user ID 410, user contact information 420, manager ID 430, manager contact information 440, system ID 450, rights 460, security level 470, description 480, and comments 490.

The implementation of data structure 400 discussed in connection with FIG. 4 is exemplary and other implementations of data structure 400 are possible. Other implementations of data structure 400 may include more fields or fewer fields. For example, an alternative implementation of data structure 400 may include fields containing information further identifying a user, such as an address, office phone number, etc., and/or links to information related to a user, protected device, etc. Data structure 400 may be stored in storage device 250 and/or elsewhere in system 100/102 and may operate with modules illustrated in FIGS. 3A and 3B.

User ID 410 may include information that identifies a user, such as a user of client 110. User ID 410 may include a user's name, address, department name, mail stop, employee number, etc.

User contact information 420 may include information that can be used to communicate with a user identified in user ID 410. User contact information 420 may include a telephone number, an email address, an instant messaging (IM) identifier, etc.

Manager ID 430 may include information that identifies a manager related to a user identified in user ID 410. For example, manager ID 430 may identify a manager that oversees work performed by a user identified by user ID 410. Manager ID 430 may include a manager's name, address, department name, mail stop, employee number, etc.

Manager contact information 440 may include information that can be used to communicate with a manager identified in manager ID 430. Manager contact information 440 may include a telephone number, an email address, an instant messaging (IM) identifier, etc.

System ID 450 may include information that identifies a system or device related to server 130/132. For example, system ID 450 may identify a system, such as destination 150, for which server 130/132 can maintain user access and/or authorization information. System ID 450 may include device names, addresses (e.g., network addresses), and/or other device identifiers.

Rights 460 may include information that identifies one or more access and/or authorization rights related to a user identified by user ID 410. For example, an entry in rights 460 may indicate access rights for a user with respect to a system identified by a corresponding entry in system ID 450. Rights 460 may include alphanumeric information, links, etc. that can be used to identify one or more rights. Information in rights 460 may be mapped to information related to a user, such as a user's job title, department name or number, user's office location, etc. For example, a user having a title of "system administrator" may have an entry in rights 460 indicating a highest level of authorization, such as full reading and writing permission with respect to a system identified in system ID 450. Rights 460 may include information received from authorization module 340 and/or authorization server 170.

Security level 470 may include information that identifies a security level related to a user identified by user ID 410. For example, security level 470 may include information that identifies access rights for a user with respect to a system identified by a corresponding entry in system ID 450. Information in security level 470 may further be related to corresponding information in an entry for rights 460. For example, information in rights 460 may be presented in a format that may be difficult for certain individuals, such as a reviewer, to understand. Information in security level 470 may be presented according a determined range (e.g., a scale of 1 to 4), where 4 indicates a highest level of authorization (e.g., full read and write capability) and 1 indicates a lowest level of authorization (e.g., read only privilege). Information presented in security level 470 may be configured to be easily understood by individuals, such as a reviewer. Information in security level 470 may be mapped to other information related to a user identified in user ID 410, such as a job title, department name, information related to authorization module 340, authorization server 170, etc.

Description 480 may include information related to a system identified in system ID 450, information in rights 460, and/or information in security level 470. For example, description 480 may include information that further identifies a system identified in a corresponding entry of system ID 450.

Comments 480 may include information that is related to another entry in data structure 400. For example, comments 480 may include information that further identifies and/or explains access privileges related to an entry in rights 460 or security level 470.

Information in data structure 400 may be used to populate portions of a user interface, such as GUI 312 and/or a user interface provided by web server 180. In one implementation, data structure 400 operating with GUI 312/web server 180 may be used to populate drop down menus and/or windows within output device 270 (e.g., a display device).

FIG. 5 illustrates an exemplary data structure to store information related to a review of a user or a protected system consistent with principles of the invention. Data structure 500 may be stored in memory 230, ROM 240, or storage device 250 and may operate with modules illustrated in FIGS. 3A and 3B. The implementation of data structure 500 discussed in connection with FIG. 5 is exemplary and other implementations of data structure 500 are possible. Other implementations of data structure 500 may include more fields or fewer fields.

Data structure 500 may include user ID 410, system ID 450, rights 460, security level 470, review date/time field 520, reviewer ID field 530, review location field 540, status field 550, reviewed field 560, link field 570, and authorization date/time field 580. User ID 410, system ID 450, rights 460 and security level 470 may be configured as described in connection with FIG. 4.

Review date/time field 520 may include information that identifies when data structure 500 and/or information contained therein was created, modified, and/or saved. Reviewer ID field 530 may include information that identifies an individual that performs a review of a user identified by user ID 410. Reviewer ID field 530 may include a reviewer's name, address, department name, mail stop, employee number, etc. In one implementation, reviewer ID field 530 may identify a manager, such as a project or department manager, of a user identified by user ID 410.

Review location field 540 may include information related a location where a review of a user identified by user ID 410 was performed. Review location field 540 may identify a device, such as a computer, or a location, such as an office, a network drop, a geographic location, etc.

Status field 550 may include information related to system ID 450, rights 460 and/or security level 470. For example, status field 550 may indicate whether information in rights 460 represents a new entry, an updated entry, and/or a deleted entry.

Reviewed field 560 may include information that identifies whether the user identified in user ID 410 has been reviewed with respect to a system identified in system ID 450. For example, an entry of "yes" in reviewed field 560 may indicate that the user has been reviewed with respect to a system, such as finance or security (in FIG. 5).

Link field 570 may include information related to a link. For example, link field 570 may include alphanumeric information that identifies a link to additional information related to a user, a system, access rights, a status of the user or system, etc.

Authorization date/time field 580 may include information that identifies when a corresponding entry in system ID 450 was reviewed, modified, and/or created. Authorization date/time field 580 may include a date, a time and/or a date and time.

Exemplary User Interfaces

FIGS. 6-9 illustrate exemplary user interfaces that can be used to review individuals, systems, etc. The user interfaces of FIGS. 6-9 are exemplary in nature and other types of interfaces may be used. In addition, alternative user interfaces may include more or fewer fields and/or information than what is illustrated in the exemplary interfaces of FIGS. 6-9. In an implementation, exemplary user interfaces may be provided via a web browser. Alternative implementations may present user interfaces via other techniques and/or applications.

Figure 6:
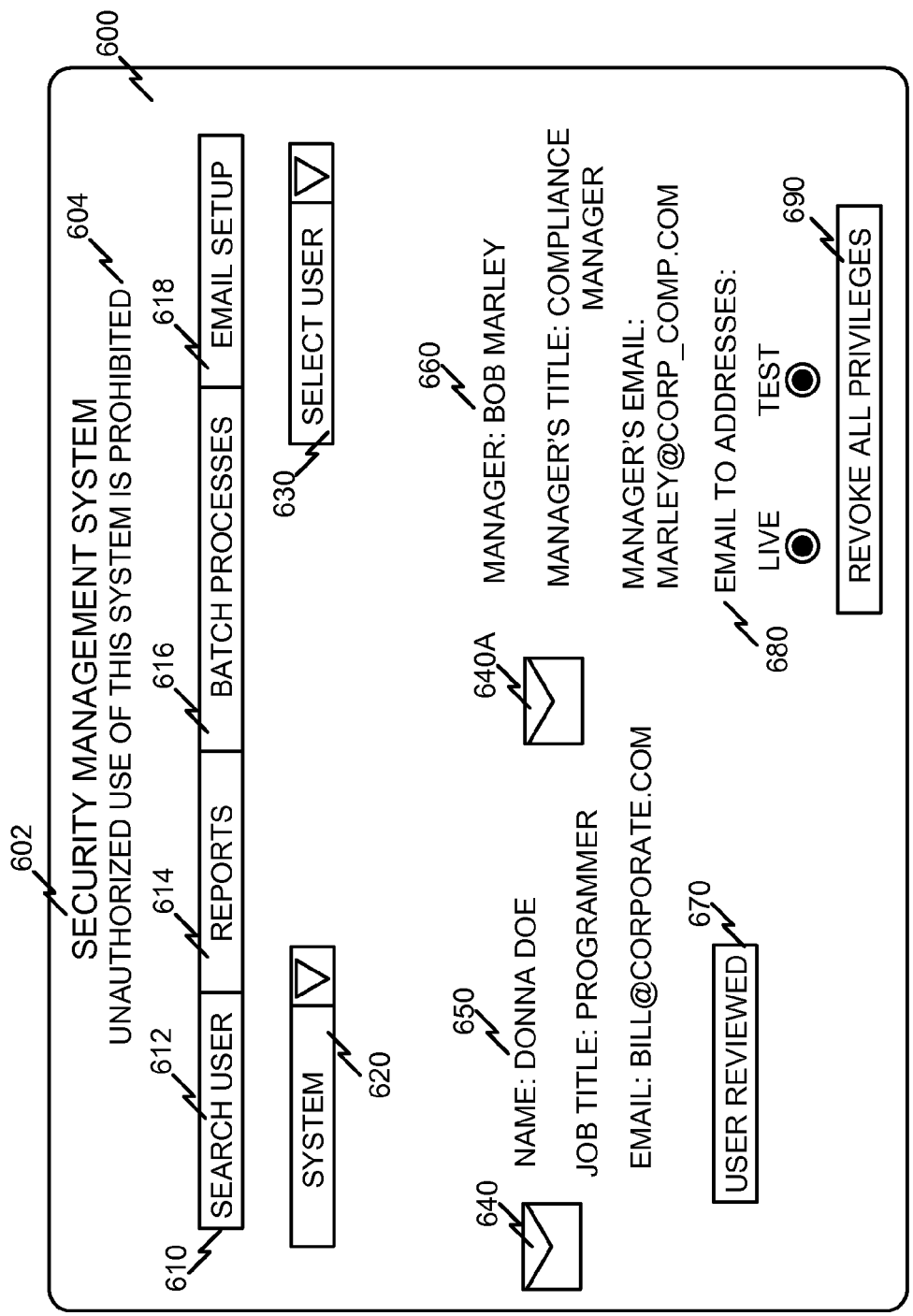
FIG. 6 illustrates an exemplary user interface to display information related to a system or a user consistent with principles of the invention.

FIG. 6 illustrates an exemplary user interface to display information related to a system or a user consistent with principles of the invention. Display 600 may include title 602, notice 604, action bar 610, system drop down menu 620 (hereinafter system menu 620), select user drop down menu 630 (hereinafter user menu 630), icon 640, icon 640A, user field 650, manager field 660, user reviewed radio button 670

(hereinafter review button 670), email control 680, and revoke privileges radio button 690 (hereinafter revoke button 690).

Display 600 may be provided to a reviewer via output device 270. Title 602 may include information that identifies an application that is run to provide other information in a display, such as display 600. Title 602 may identify a system being reviewed, may identify an entity owning and/or operating an application, may identify an entity owning/operating hardware used to perform a review, etc. Notice 604 may include information that identifies a legitimate use of information displayed in display 600, an owner of information displayed in display 600, and/or a warning, such as a copyright warning and/or warnings with respect to information displayed in display 600.

Action bar 610 may include information related to actions that can be performed in cooperation with display 600. Information in action bar 610 may be displayed on display 600 via radio buttons, drop down menus, windows, etc. In an implementation, action bar 610 may include search user 612, reports 614, batch process 616, and email setup 618.

Search user 612 may include information that allows a reviewer to search for a user. For example, selecting search user 612 with a pointing device, such as a mouse, trackball, pen, and/or touch sensitive display entry, may open a window or drop down menu that contains a list of individuals, such as users of protected systems monitored by server 130/132. Alternatively, search user 612 may provide a window that allows a reviewer to enter the name of a user. All systems related to the user may be displayed on output device 270 in response to the user's name.

Reports 614 may include information about reports that contain information related to a review, such as a review of a system, user, department, etc. Reports 614 may provide a drop down menu that lists names of reports that are archived on server 130/132. A reviewer may select a report listed in reports 614 to open the report within a display of output device 270.

Batch process 616 may include information about batch processes that can be run with respect to a user, system, etc. For example, selecting batch process 616 may provide a drop down menu that includes names of batch processes or procedures that can be run with respect to one or more users and/or other criteria. Batch processes may allow a reviewer to simultaneously review two or more individuals, devices, networks, departments, etc., without having to individually review each individual device, network, department, etc.

Email setup 618 may include information that allows a reviewer to set up one or more email messages and/or information related to one or more email messages. For example, selecting email setup 618 may open a window that allows a reviewer to create an email message and that allows the reviewer to identify one or more recipients of the email message.

System menu 620 may include a radio button that provides a reviewer with the names of one or more systems that can be reviewed. For example, a reviewer may select system menu 620 and a list of system names and/or system identifiers may be displayed via a window or drop down menu. The reviewer may select one of the systems and that system's name and/or other type of identifier may be displayed in system menu 620. When a reviewer completes a review with respect to the selected system, that system's name may be removed from the window/drop down menu associated with system menu 620.

User menu 630 may include a radio button that provides a reviewer with names of one or more individuals, such as users, that can be reviewed. Users identified via user menu 630 may be related to a system identified in system menu 620. For example, when a reviewer selects a system named "finance" via system menu 620, a list of users having permission to access the finance system may be displayed via user menu 630. The reviewer may select a user via user menu 630 and may perform a review with respect to that user. When a reviewer completes a review of the selected user, that user's name may be removed from user menu 630.

Icons 640 and 640A may include links to information and/or applications. For example, icons 640/640A may provide a reviewer with information related to email generator 322, email application 324 and/or email server 190 when the reviewer selects icon 640 or 640A with a pointing device. In another implementation, selecting icon 640 may send an email message to a user identified in user menu 630 and/or user field 650, and selecting icon 640A may send an email message to an individual identified in manager field 660. Email application 324 and/or email server 190 may send email messages based on instructions received via icon 640 or 640A.

User field 650 may include information related to a user, such as a user of a system identified in system menu 620. In an implementation, user field 650 may include information related to a user selected and/or displayed via user menu 630. User field 650 may include information, such as a name, job title, email address, office number, mailing address, telephone number, etc.

Manager field 660 may include information related to a manager of the user identified in user menu 630 and/or user field 650. In an implementation, manager field 660 may include information, such as a name, job title, email address, office number, mailing address, telephone number, etc.

Review button 670 may be related to instructions that identify when a review for a user identified in user menu 630 and/or user field 650 has been reviewed. For example, review button 670 may cause information related to an identified user to be saved to data structure 500, which in turn may be saved to database 140/142.

Email control 680 may include information that allows a reviewer to select a mode for sending one or more email messages. For example, email control 680 may let a reviewer send an email message in a test mode or a live mode. A test mode may cause the email message to be sent back to the reviewer. The message received by the reviewer in test mode may include content and formatting that would have been sent to a recipient if the test email message had actually been sent to the recipient. The test mode may allow the reviewer to determine that message formatting and/or content is acceptable before sending the message to a recipient. Live mode may cause an email message to be sent to an intended recipient.

Revoke button 690 may include instructions that cause server 130/132 to revoke privileges related to a user. For example, if "Donna Doe" is the name of a user identified in user menu 630 or user field 650, selecting revoke button 690 may cause all access privileges related to Donna Doe to be revoked. In an implementation, revoke button 690 may be used when Donna Doe no longer works for an entity related to system 100/102.

FIG. 7 illustrates an exemplary user interface to display information related to reviewing a user consistent with principles of the invention. Display 700 may provide a reviewer with information related to one or more users. Display 700 may include fields used in conjunction with display 600 (FIG. 6), list 710 and drop button 720.

List 710 may include information related to an individual identified in user menu 630 and/or user field 650. For example, a reviewer may select a user named Donna Doe (user field 650, FIG. 6). List 710 may include information read from a data structure, such as data structure 400 and/or 500. In an implementation, list 710 may include the user's name, systems that the user has access rights to, names of rights for respective systems, descriptions of rights for respective systems, comments related to the respective systems, and/or security levels related to the respective systems. Other implementations of list 710 may include more or fewer entries. List 710 may be configured to allow information displayed therein to be sorted via headings in list 710. For example, a reviewer may select "security level" to cause listed information to be sorted via security level, e.g. from a highest to lowest value of security level.

Drop button 720 may include instructions that allow a reviewer to delete access rights for an identified user with respect to a system or portion of a system, such as a directory on the system. For example, a reviewer can select drop button 720 in the top row of list 710 to delete Donna Doe and her access rights from a database containing access information for a finance system.

Figure 8:
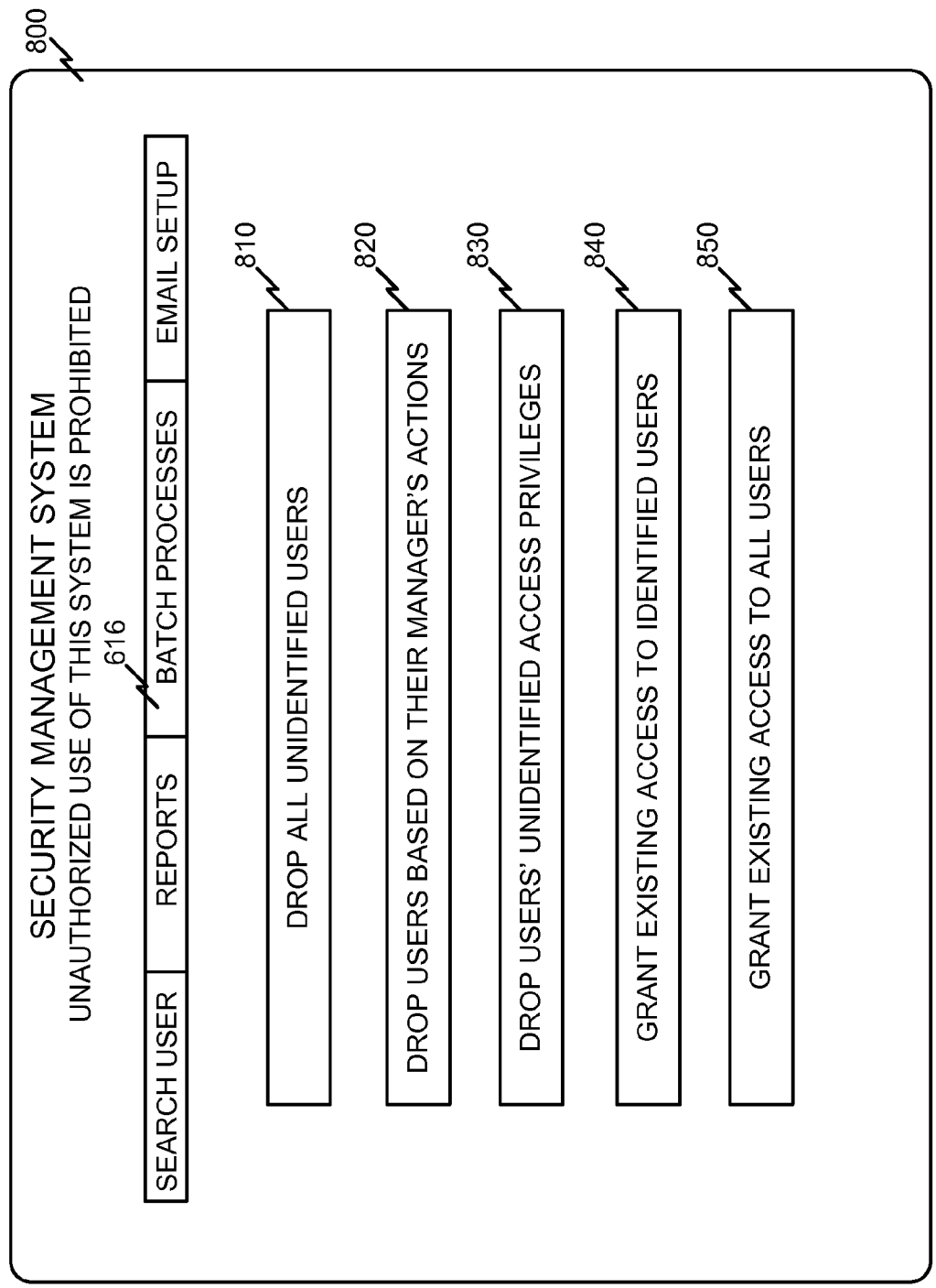
FIG. 8 illustrates an exemplary user interface to display information that can be used to perform batch processes with respect to user privileges consistent with principles of the invention.

FIG. 8 illustrates an exemplary user interface to display information that can be used to perform batch processes with respect to user privileges. Display 800 may include information related to batch process 616. For example, a reviewer may select batch process 616 and may be presented with the information in display 800. Radio buttons related to batch processes may launch procedures, e.g., scripts, to perform one or more functions.

Drop all unidentified users 810 (hereinafter button 810) may cause server 130/132 to delete users that are not identified with a system. System users who are marked as "unidentified" may have their system privileges revoked via a single action (e.g., a keystroke, mouse click, voice command, etc.) without requiring that the reviewer review access rights/privileges for each user. "Unidentified user," as used herein, may refer to a user that has a system login and/or password but no accompanying information that can be used to further and/or properly identify the individual. Examples of identifying information are, but are not limited to, the person's unique employer identification number, the person's current company email address, the person's name along with his/her department name or number, etc.

Drop users based on their manager's actions 820 (hereinafter button 820) may cause server 130/132 to delete users based on instructions received from a manager. Button 820 may interact with stored information when executing instructions related to the manager. For example, a single input, e.g. a keystroke, may be used to disassociate users from a system when a manager related to those users indicates that those users should not have access to the system. Button 820 may revoke the users' privileges with respect to the system. Button 820 may allow a reviewer to perform the above action without having to review each user's access and/or system privileges.

Drop users' unidentified access privileges 830 (hereinafter button 830) may cause server 130/132 to drop access privileges for users when the users are not identified with a system administered by server 130/132. In certain situations, a user's privileges with respect to a protected system may not be clearly identifiable, or the user's privileges may be identified via codes that are difficult for a reviewer or manager to understand. Button 830 may allow the reviewer to revoke these "unidentified" access privileges via a single action. Button 830 may perform the above action without requiring that the reviewer personally review each user's access and/or system privileges prior to dropping that user's unidentified privileges.

Grant existing access to identified users 840 (hereinafter button 840) may cause server 130/132 to approve the identified users with respect to existing access privileges enjoyed by the users. Button 840 may allow a reviewer to grant all identified users continued system access at a security level 470 and/or rights 460 level currently associated with the respective users. Use of button 840 may not require the user to be "identified." Button 840 may allow the reviewer to grant continued system access to identified users without requiring that that reviewer individually review each user.

Grant existing access to all users 850 (hereinafter button 850) may cause server 130/132 to grant access to all users related to a manager, reviewer, system, etc. Button 850 may allow a reviewer to grant all users continued access via a single action. Use of button 850 may not require that a user be identified. Button 850 may allow a reviewer to grant continued system access to the users without individually reviewing each user.

Figure 9:
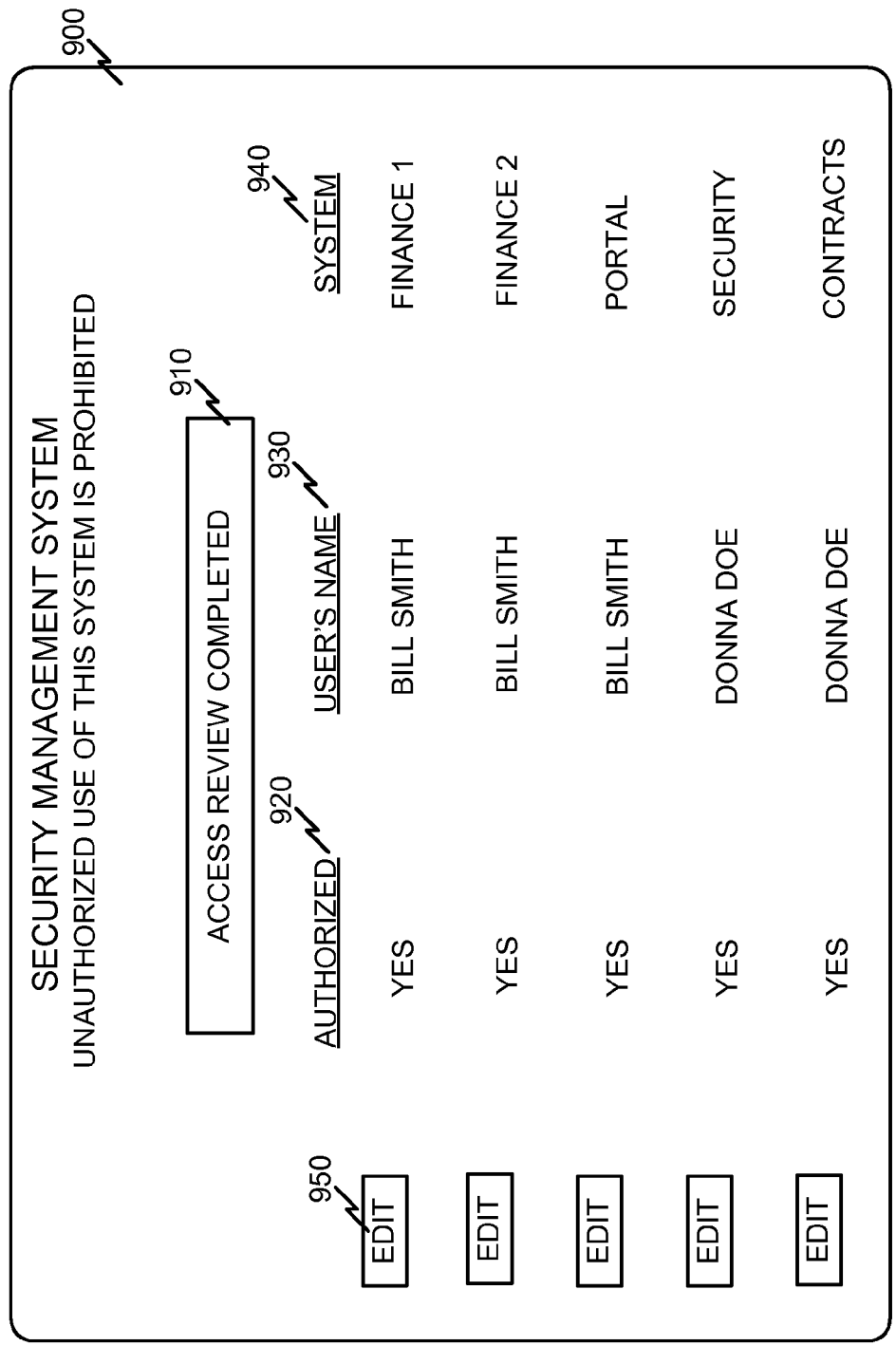
FIG. 9 illustrates an exemplary user interface to display information related to an access review performed on behalf of a user consistent with principles of the invention.

FIG. 9 illustrates an exemplary user interface to display information related to an access review consistent with principles of the invention. Display 900 may be used to provide a reviewer or auditor with information related to a review performed on behalf of one or more users. For example, a reviewer may have performed a review, such as a security review, with respect to a number of users using display 600, 700 and/or 800. Display 900 may display summary results for the review. Information displayed via display 900 may be read from data structure 400 and/or 500 and/or other devices in system 100/102.

Display 900 may include an access review completed button 910 (hereinafter review button 910), authorized field 920, user's name field 930, system field 940 and edit buttons 950. Review button 910 may include instructions to signal a device, such as server 130/132, that a review of one or more users has been completed. In an implementation, a reviewer may select review button 910 to save results of a review to memory.

Authorized field 920 may include information that indicates whether a user has been authorized with respect to one or more systems. An entry of "yes" may indicate that a user is authorized to access a protected system pursuant to one or more access parameters, such as system security parameters and/or policies.

User's name field 930 may include information that identifies a user. Information in user's name field 930 may be related to entries in authorized field 920 and/or information in system field 940. System field 940 may include information that identifies a system that is related to a user identified in user's name field 930.

Edit button 950 may include instructions that allow a reviewer or auditor to make changes to information related to a user identified in user's name field 930, system field 940, and/or other fields (not shown in FIG. 9). For example, a reviewer may select an edit button 950 related to an entry in user's name field 930 via a pointing device. A window may open that contains the user's name along with other information related to the user, such as names of systems that the user can access, security rights related to the user, security levels related to the user, comments about the user and/or systems that the user can access, etc. The reviewer may make changes to information related to the user and may save the changes. The reviewer may close the window and may return to display 900.

Exemplary Messaging Interface

Figure 10:
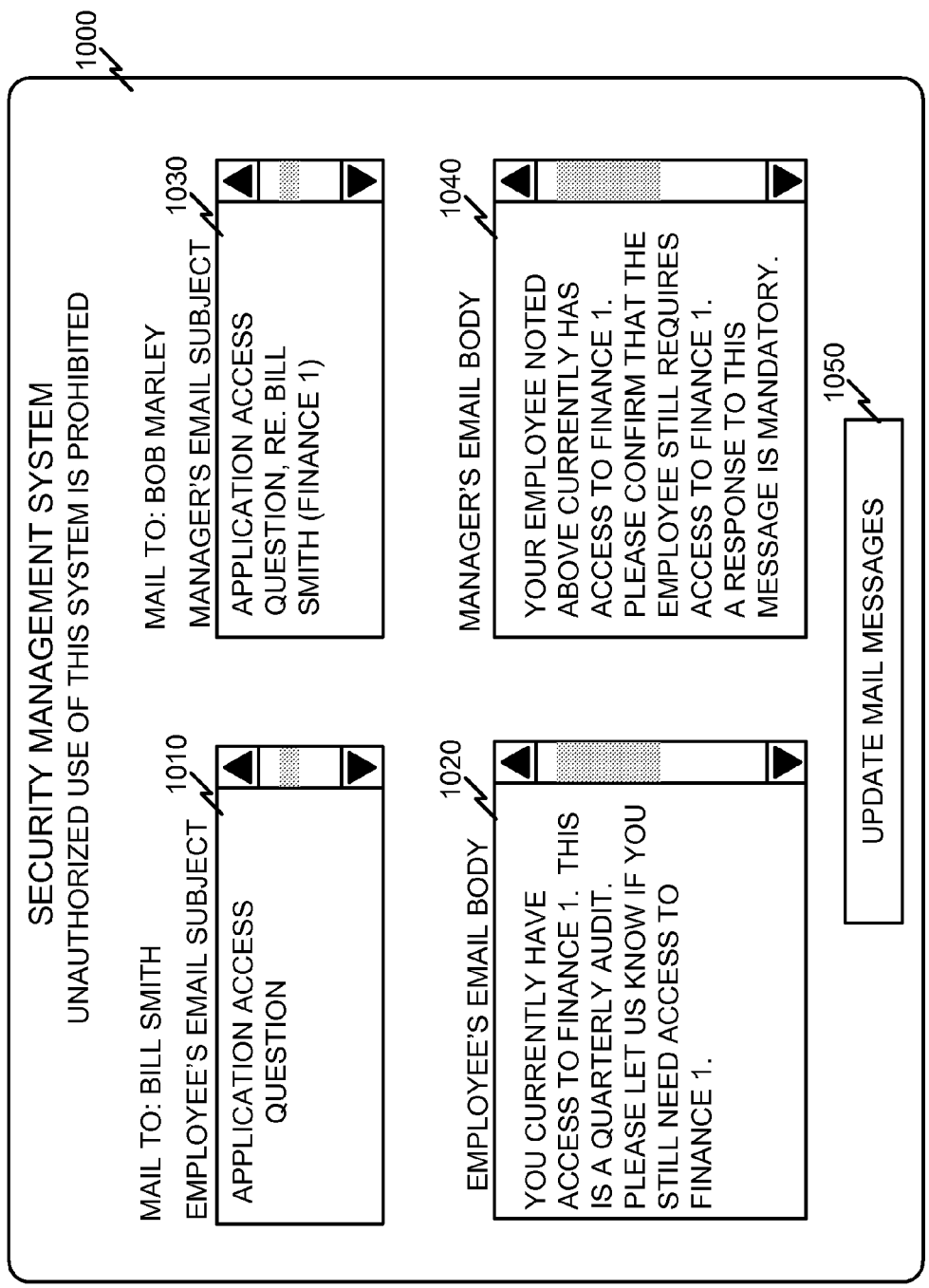
FIG. 10 illustrates an exemplary user interface to display information related to messages that can be used when performing access reviews on behalf of a user or system consistent with principles of the invention.

FIG. 10 illustrates an exemplary user interface to display information related to messages that can be used when performing access reviews on behalf of a user. Display 1000 may provide a reviewer or auditor with the ability to draft, review, and/or edit messages, such as email messages, that can be sent to a user and/or an individual related to the user, such as a manager. Display 1000 may be provided to a reviewer/auditor in response to an input, such as by selecting email setup button 618 (FIG. 6) via a pointing device.

Display 1000 may include information related to a user on one side (e.g., the left side of FIG. 10) and information related to another individual on another side (e.g., the right side of FIG. 10). Display 1000 may include employee subject window 1010, employee body window 1020, manager subject window 1030, manager body window 1040, and update email messages button 1050. Employee subject window 1010 may include content forming a subject of a message prepared on behalf of the user. Employee body window 1020 may include content forming the body of a message that will be sent to the user (Bill Smith).

Manager's subject window 1030 may include content forming a subject of a message prepared on behalf of an individual, such as a manager. Manager's body 1040 may include content forming the body of a message that will be sent to the individual identified above manager's subject window 1030 (Bob Marley).

Update email messages button 1050 may include instructions that save changes made by the reviewer, such as changes to windows 1010, 1020, 1030 and/or 1040. Saved information related to update email messages button 1050 may be sent to the user and/or the manager when icon 640 or 640A is selected via a pointing device.

An implementation of display 1000 may be configured to populate windows 1010, 1020, 1030, and/or 1040 with predetermined content when display 1000 is first displayed via output device 270. The predetermined content may allow a reviewer to send messages to recipients without having to type or cut/past address, subject, and/or body content into the messages. Windows 1010, 1020, 1030, and/or 1040 may be configured to allow the reviewer to add new text, remove predetermined text, and/or change predetermined and/or new text via an input device, such as a keyboard, to customize messages.

Exemplary Reporting Format

FIG. 11 illustrates an exemplary audit report consistent with principles of the invention. Report 1100 may be generated by report interface 316 and may be displayed to a reviewer or auditor via a display device or via hardcopy. Alternative implementations of report 1100 may include more fields and/or fewer fields than the implementation illustrated in FIG. 11. Report 1100 may include system ID 450, security level 470, description 480, authorization date/time field 570, authorized field 920, title 1110, authorized by field 1120, privilege date 1130, privileges field 1140 and note field 1150.

System ID 450, security level 470, description 480, authorization date/time field 570, and authorized field 920 may be implemented as previously described in connection with FIGS. 4, 5, and 9, respectively. Title 1110 may include information that identifies a user that is related to other information in report 1100, such as system ID 450, security level 470, description 480, authorization date/time field 570, authorized field 920, authorized by field 1120, privilege date 1130, privileges field 1140, note field 1150, etc.

Authorized by field 1120 may include information that identifies an individual that reviewed and/or approved a user identified in title 1110. Privilege date 1130 may include information that identifies when a user identified by title 1110 received his/her privilege with respect to a system identified by system ID 450.

Privileges field 1140 may include information that identifies the type of privilege that is related to the user identified via title 1110 with respect to a system identified via system ID 450. Note field 1150 may include information that describes or embellishes entries in system ID 450, security level 470, description field 480, authorization date/time field 570, authorized field 920, title 1110, authorized by field 1120, privilege date 1130, privileges field 1140 and/or other fields (not shown in FIG. 11).

Exemplary Processing

Figure 12:
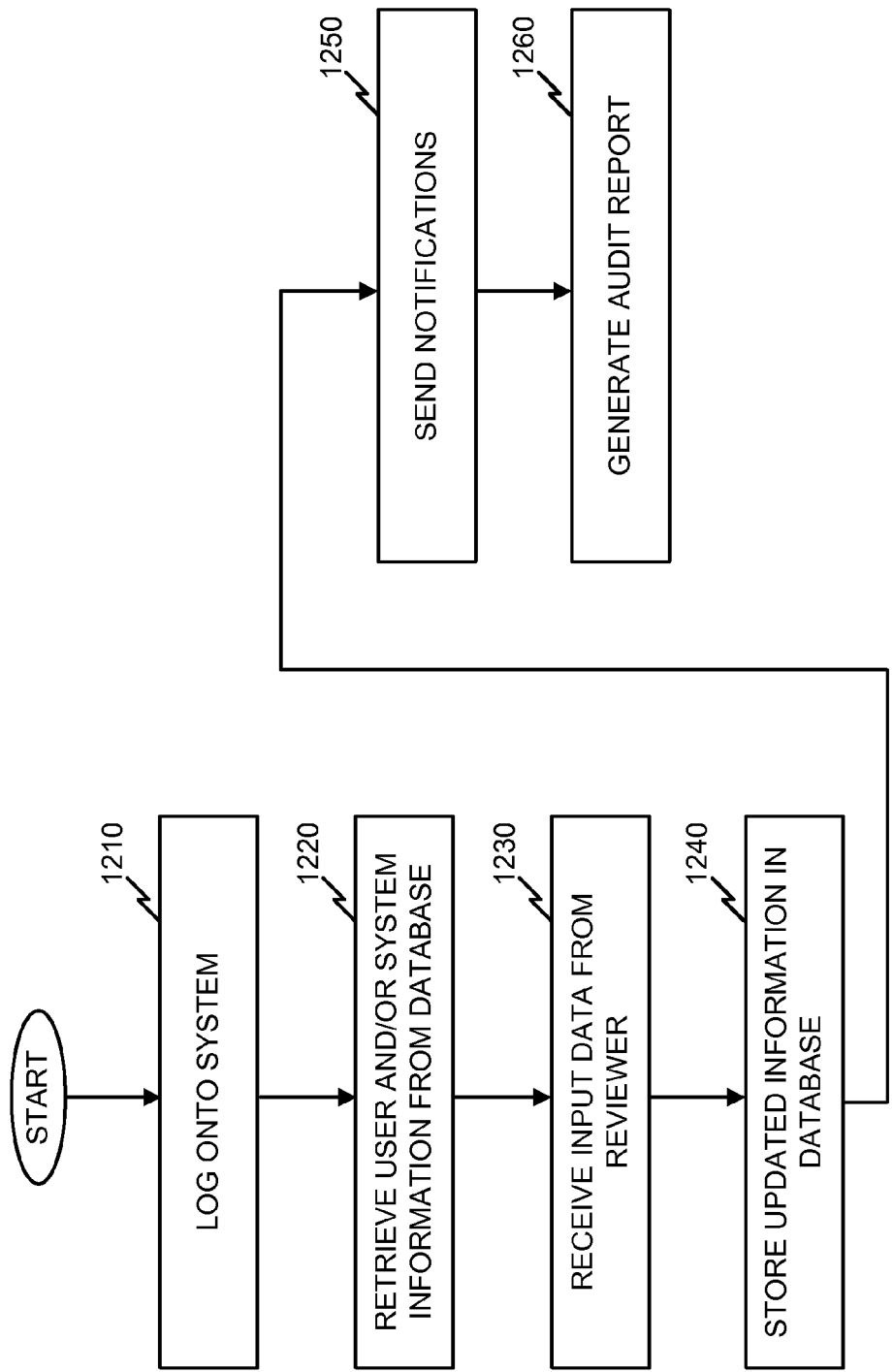
FIG. 12 illustrates exemplary processing consistent with principles of the invention.

FIG. 12 illustrates exemplary processing consistent with principles of the invention. Implementations described herein may be used to maintain, review and/or audit substantially any type of policy or procedure. For example, implementations may be used to review and/or audit policies related to physical access (such as access of persons to certain buildings), network access (e.g., routing and/or access policies applied to devices in a network), distribution of assets (e.g., whether assets should be allowed in certain areas or on certain routes), etc.

In an implementation, techniques and/or devices may be used to monitor, review and/or audit user access privileges with respect to protected systems on a network. An individual, such as a reviewer, may log onto a system that contains information about users, resources (e.g., destination devices and/or directories), access privileges, and/or other information useful for monitoring, reviewing, and/or auditing users, policies and/or procedures (block 1210).

A reviewer may enter a user name and password to log onto server 130. The reviewer may be presented with a display that includes information related to reviewing users and/or systems. For example, the reviewer may be presented with display 600 (FIG. 6) via a web browser based user interface. A web browser based user interface may be easy to configure based on preferences of a reviewer, auditor and/or system administrator. For example, a reviewer may access a preferences menu that allows the reviewer to configure the way information is displayed on display device 270. The web browser based interface may include radio buttons, drop down menus, windows, and/or other devices that may serve as input devices and/or input interfaces to receive input information from an operator, such as a reviewer.

The reviewer may select user and/or system information via system menu 620 and/or user menu 630. For example, the reviewer may select a system name via system menu 620 and the name of a user via user menu 630. Drop down menus, such as system menu 620 and user menu 630 may be populated with data obtained from system tables, data structures 400 and/or 500, databases (e.g., database 140), etc. Server 130 may retrieve system and/or user information from database 140 based on inputs received from the reviewer (block 1220).

Server 130 may present the reviewer with information related to the user and/or system. For example, server 130 may send information in display 700 to output device 270. Display 700 may include list 710 that may contain information about a user, such as Donna Doe, and systems for which the user has access privileges (e.g., system IDs 450, FIG. 4).

List 710 may further provide the reviewer with other information related to the user, such as rights 460, security levels 470, descriptions 480, and comments 490.

Server 130 may receive input data from the reviewer (block 1230). For example, the reviewer may select drop button 720 for one or more entries related to Donna Doe (FIG. 7). Drop button 720 may cause server 130 to delete access privileges for Donna Doe with respect to a particular system. For example, selecting drop button 720 for the "purchase" system may delete Donna Doe's access privileges with respect to the purchase system.

The reviewer may wish to communicate with a user (Donna Doe) and/or another individual (e.g., Donna's manager) as part of a review process performed on behalf of Donna Doe and/or systems accessed by Donna Doe. For example, the reviewer may want to ask Donna Doe (and/or her manager) if she has a continued need to access a system, such as a finance system. The reviewer may select icon 640 to send an email message to Donna Doe and/or her manager. Server 130 may run an email application (e.g., email application 324) that is configured to send a preformatted email message to Donna and/or her manager when an icon, such as icon 640 and/or 640A is selected.

In certain situations, the reviewer may want to review the content of preformatted email messages and/or may want to modify preformatted email messages before sending messages to a user and/or another individual. In these situations, the reviewer may select email setup 618. Server 130 may provide display 1000 (FIG. 10) in response to an input received from email setup 618. The reviewer may modify content related to one or more email messages via display 1000 and may select update email messages 1050 to save the changes on server 130.

The reviewer may select icon 640 (FIG. 6) to send an email message to Donna Doe and/or may select icon 640A (FIG. 6) to send an email message to Donna's manager. The email message may request information from Donna and/or her manager and/or may provide Donna and her manager with information, such as information that Donna's access rights with respect to a purchasing system were terminated.

The reviewer may select batch processes 616 when the reviewer wants to review a number of users and/or systems simultaneously. Batch processes 616 may be coupled to email generator 322 and/or email application 324 so that messages can be sent to users and/or other individuals when batch processes are used with respect to the users.

The reviewer may review a number of users with respect to a number of systems. For example, the reviewer may repeat the operations performed with respect to Donna Doe for other users, such as Bill Smith. The reviewer may review summary information for reviewed users and/or may edit information related to the users via display 900. For example, display 900 may display information about Bill Smith and Donna Doe as well as information about systems that Bill Smith and Donna Doe are associated with and/or authorization information for Bill and/or Donna with respect to these systems. The reviewer may determine whether Bill and/or Donna are authorized with respect to the systems and/or may edit information related to Bill and/or Donna if needed. For example, the reviewer may select edit button 950 to edit information related to Bill Smith and/or a system named Finance 1. Selecting edit button 950 may open a window that includes information about Bill Smith, Finance 1, Bill's manager, etc.

The reviewer may select access review completed button 910 when he/she is satisfied with information included in display 900. Selecting access review completed button 910 may save information entered by the reviewer during a review session. Server 130 may store information related to the review session in database 140.

Server 130 may update database 140 with information from the review session (block 1240). For example, server 130 may write changes to access privileges, system identifiers, security levels, etc. to database 140. Server 130 may send notifications to users, administrators, managers, and/or auditors based on results of a review session (block 1250). For example, server 130 may notify a user that his/her access privileges have been terminated, updated, and or granted based on work performed by a reviewer.

Server 130 may generate an audit report (block 1260). For example, server 130 may be configured to generate report 1100 (FIG. 11) via report interface 316 when the reviewer selects access review completed button 910. Report 1100 may include information that can be used by an auditor to determine whether the reviewer performed the review in accordance with established policies. In one implementation, report 1100 may include information about a date and/or time that an authorization was performed, the name of the person performing the authorization, whether a user was authorized, one or more systems that the user was reviewed with respect to, security levels related to the user with respect to the systems, a date on which the user was granted privileges with respect to a system, names of privileges, descriptions of information related to the review, etc. An audit report may be produced in hardcopy and/or electronic form. Server 130 may be configured to provide an authentication mechanism with report 1100, such as a watermark and/or digital signature, to establish the authenticity and/or date/time that report 1100 was created, reviewed, and/or approved.

Figure 13A:
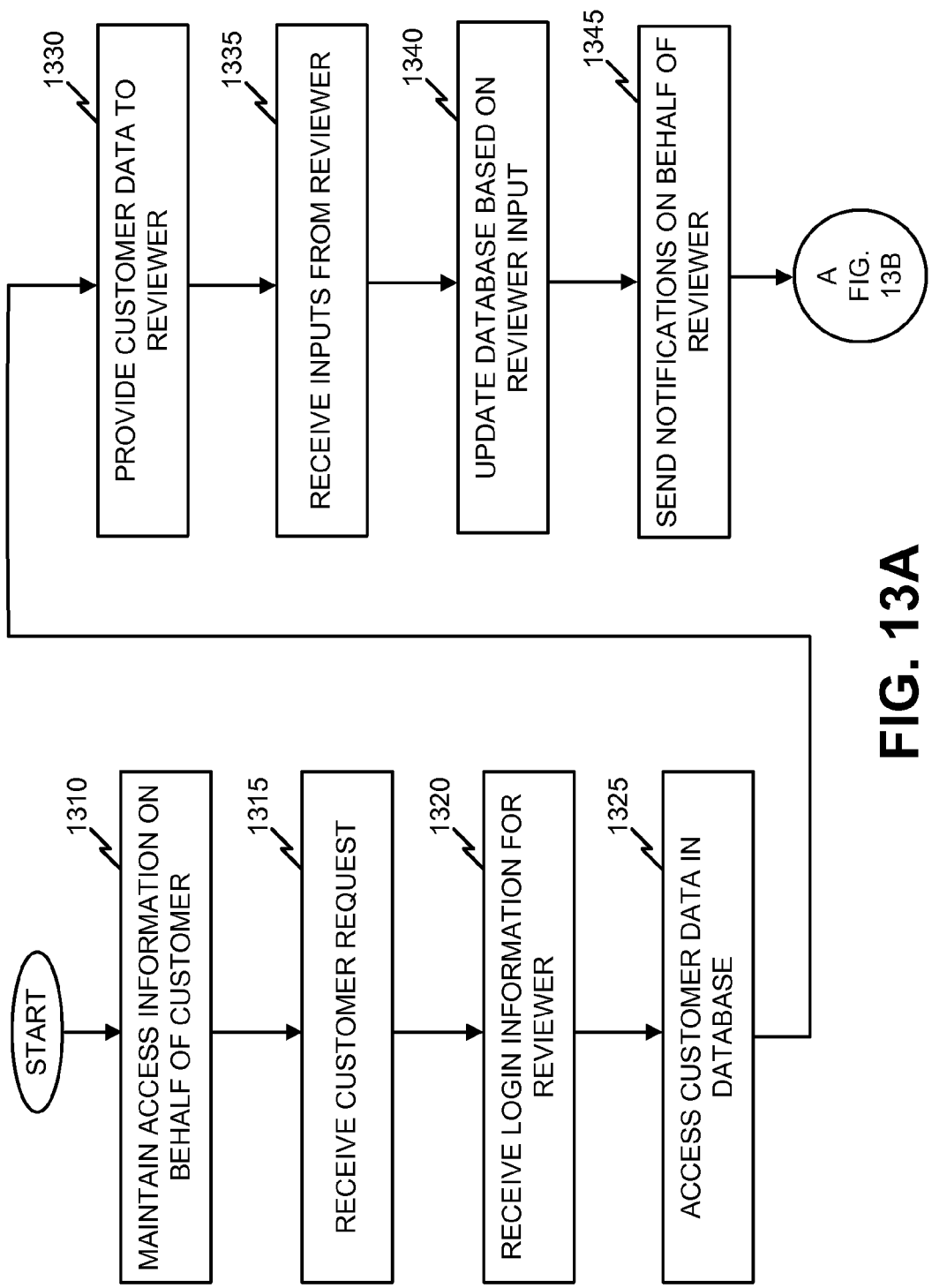
FIGS. 13A and 13B illustrate exemplary processing for a managed service implementation consistent with principles of the invention.
Figure 13B:
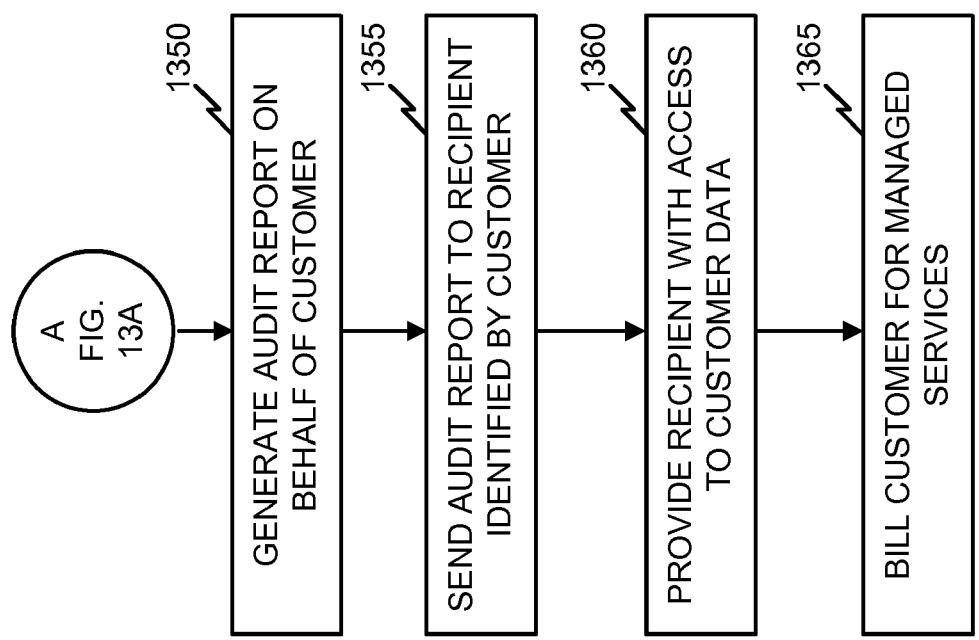

FIGS. 13A and 13B illustrate exemplary processing for a managed service implementation consistent with principles of the invention. Server 132 may maintain access information on behalf of a customer (block 1310). For example, server 132 may maintain information for a number of customers, such as a first customer related to client 110, a second customer related to client 110-1, and an $N^{th}$ customer related to client 110-N. Server 132 may maintain the access information in database 142.

Server 132 may receive a request from a device related to a customer (block 1315). For example, a reviewer may issue a request to server 132 via client 110, where the request is for information related to network access control for the customer. Server 132 may send information related to a login screen to client 110 via web server 180. For example, web server 180 may render a browser window on client 110 that asks the reviewer for a user name and password.

Server 132 may receive login information for the reviewer (block 1320). For example, authorization server 170 may receive the login information from client 110. Authorization server 170 may compare the user name and password to information in an authorization database on authorization server 170 and/or in database 142. The reviewer may be granted access to requested information when authorization server 170 determines that the user name and password are valid. Authorization server 170 may inform server 132 that the reviewer has been authorized. Server 132 may process a request received from the reviewer once the reviewer is authorized.

Server 132 may access customer data in database 142 based on a request received from the reviewer (block 1325). For example, the reviewer may identify a system via system menu 620 (FIG. 6) and a user via user menu 630. Server 132 may query database 142 for data structure 400 related to the identified user and system. Server 132 may pass the retrieved data onto web server 180.

Web server 180 may send the customer data to the reviewer via a browser window, such as display 700 (block 1330). The browser window may be configured to allow the reviewer to make selections and to input data via a keyboard. Web server 180 may receive inputs from the reviewer (block 1335). For example, the reviewer may drop a user's access to an identified system via drop button 720 (FIG. 7). Web server 180 may pass the reviewer's data to server 132.

Server 132 may update database 142 based on data received from the reviewer (block 1340). Data received from the reviewer may also include a request that one or more email messages be sent to identified recipients. For example, data may request that an email message be sent to the user and to the user's department manager, where the email messages serve to notify the user and the manager that a change has been made to the user's access rights with respect to one or more systems.

Server 132 may send notification emails on behalf of the reviewer (block 1345). For example, server 132 may send information to email server 190 that causes email server 190 to generate email messages using a template. The template may include a user email format that is used to inform the user that his/her status has changed with respect to a system. The template may further include a manager email format that is used to inform the manager that the user's status has changed with respect to a system. Email server 190 may send the email notifications to the user and/or the manager via provider network 125 and/or network 120.

Server 132 may receive a request from the reviewer and/or a party acting on behalf of the reviewer for an audit report related to one or more systems related to the reviewer. Server 132 may generate an audit report on behalf of a customer, such as an entity that employs the reviewer (block 1350, FIG. 13B). For example, server 132 may generate audit report 1100 as shown in FIG. 11. Server 132 may send audit report 1100 to a destination based on a request received from the customer and/or a party affiliated with the customer (block 1355). For example, server 132 may send audit report 1100 to an independent auditing firm that is employed by the customer to perform audits of the customer's network access policies. Server 132 may send audit report 1100 to the auditor as an email attachment using email server 190.

Server 132 may provide the auditor with access to customer data related to information in audit report 1100 (block 1360). For example, the customer may have given the auditor permission to randomly sample data generated via the review process performed with respect to one or more users and/or one or more systems. The auditor may log into the customer's account via authorization server 170. Once inside database 142, the auditor may perform a random sampling of the customer's review information.

Server 132 may bill the customer for services related to the review and/or audit (block 1365). For example, the customer may pay a monthly price to a service provider that stores customer information related to performing network access policy reviews and/or audits. At the end of each month, the service provider may bill the customer for services incurred during that month.

Implementations of system 100/102 described herein are scalable and can be adapted to perform reviews of substantially any type of information. System 100/102 may be deployed in a modular fashion, such as by using encapsulated code (e.g., plug-in modules) to adapt capabilities of system 100/102 for varying situations. For example, system 100/102 can be configured with a first plug-in module to handle reviews and/or audits according to requirements of the Sarbanes Oxley Act and a second plug-in module to handle reviews and/or audits related to a corporate mandated security procedure. Plug-in modules may include machine-executable instructions to perform operations related to particular reviews and/or audits. Code used in system 100/102 may be configured to build and/or use processes and/or procedures dynamically to facilitate efficient use of computing resources, such as memory and/or processor cycles.

Implementations of system 100/102 may be configured to work with applications manufactured and/or supported by substantially any number of vendors. For example, system 100/102 may implement database 140/142 as a structured query language (SQL) database made by a first vendor, email generator 322 made by a second vendor, email application 324 as a simple mail transfer protocol (SMTP) server made by a third vendor, GUI 312 as a web browser made by a fourth vendor, etc.

Implementations of system 100/102 may be configured with a timer that sends reminders and/or launches a review procedure according to a schedule. For example, the timer may be configured to send reminders monthly, quarterly, and/or annually, according to configurable criteria.

Implementations of system 100/102 may be configured to work with other systems and/or applications. For example, a first implementation of system 100/102 may be configured to work with an access monitoring and control application. The access monitoring and control application may use access and/or monitoring data to monitor when users access protected systems and may create a log file of users' access activities. System 100/102 may interface to the monitoring and access control application and may receive the log file. System 100/102 may use the log file to determine whether a user should be granted continued access to a protected system. System 100/102 may provide information related to the log file to a reviewer so that the log file information can be used during the review of the user and/or systems related to the user. A second implementation of system 100/102 may be configured to interface with a compliance package, such as a Sarbanes Oxley Act compliance package. The compliance package may include rules that are applied to audit report 1100 to determine if the audit report complies with requirements of the Sarbanes Oxley Act.

CONCLUSION

Implementations consistent with the principles of the invention may allow a reviewer to review substantially any number of users and/or systems with respect to criteria, such as system access criteria. Implementations may generate a report based on the review, and the report can be used to perform audits on the reviewer and/or a process used by the reviewer while performing the review.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than a restrictive sense.

For example, implementations consistent with the principles of the invention can be implemented using devices and configurations other than those illustrated in the figures and described in the specification without departing from the spirit of the invention. Devices and/or components may be added and/or removed from the implementations of FIGS. 1A, 1B, 2, 3A and 3B depending on specific deployments and/or applications. Further, disclosed implementations may not be limited to any specific combination of hardware, software and/or firmware. In addition, while a series of acts has been described with respect to FIGS. 12, 13A and 13B the order of acts in FIGS. 12, 13A and 13B may be varied in other implementations. Moreover, non-dependent acts may be implemented in parallel.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A user interface device, comprising:
    a memory to store:
        user information related to a plurality of users of system resources associated with a particular system;
        system information related to the system resources; and
        policy information related to a plurality of policies specifying access privileges for particular ones of the users with respect to particular ones of the system resources; and
    a plurality of input devices to:
        receive input information, from an operator, related to performing batch processing of particular ones of the plurality of policies, without performing a review of the user information pertaining to each user, of a set of the plurality of users, and without performing a review of the system information pertaining to a particular system resource, where performing the batch processing includes:
            revoking access privileges, for the particular system resource, of a first group of users, of the set of the plurality of users, where revoking the access privileges is based on determining that each of the first group of users is associated with access privileges for the particular system resource, and that each of the first group of users is associated with a login identification and/or a login password, associated with the particular system, but is not associated with any other type of identifying information,
            revoking access privileges, for the particular system resource, of a second group of users, of the set of the plurality of users, based on the second group of users, of the set of the plurality of users, being identified, for disassociation from the particular system, by a system manager associated with the set of the plurality of users,
            granting continued access privileges, for the particular system resource, for a third group of users, of the set of the plurality of users, based on existing access privileges, for the particular system resource, that are common to each user, of the third group of users, and
            revoking, for each user, of a fourth group of users, of the set of the plurality of users, particular user privileges, associated with the particular system resource, based on the particular user privileges not being identifiable by the system manager.

2. The user interface device of claim 1, where one of the input devices receives input information to delete the user information, the system information, or the policy information associated with one of the plurality of users.

3. The user interface device of claim 1, where one of the input devices receives input information to revoke access privileges with respect to first group of users.

4. The user interface device of claim 1, where one of the input devices receives input information to send a message to one of the plurality of users or to the system manager.

5. The user interface device of claim 4, where a content of the message is related to the selected batch processing performed.

6. The user interface device of claim 1, where one of the input devices receives input information indicating that the policy information associated with one of the plurality of users was reviewed with respect to at least one of the system resources and the corresponding access privilege.

7. A managed service, comprising:
    a device to:
        receive a request for access information corresponding to a plurality of system resources associated with a system,
        send the access information to a reviewer based on the request,
        display, via a user interface, a plurality of selectable batch processes with respect to the access information, where the selectable batch processes include:
            a first process to modify, based on a single input received from the reviewer, access information, associated with a first set of users,
                where each user, of the first set of users, is currently allowed to access a particular system resource, of the system,
                where each user, of the first set of users, is associated with a login identification and/or a login password, that is associated with user privileges for the particular system resource, and
                where the access information associated with the first set of users is modified based on a determination that each user, of the first set of users, is not associated with identifying information other than the login identification and/or the login password,
            a second process to modify, based on a single input received from the reviewer, access information, associated with a second set of users, where the access information associated with the second set of users is modified to prevent the second set of users from further accessing the system, and where modifying the access information associated with the second set of users is based on the second set of users being identified for disassociation from the system by a system manager associated with the second set of users,
            a third process to approve, based on a single input received from the reviewer, access information, associated with a third set of users, based on existing privileges that are common to each of the third set of users, and
            a fourth process to modify, based on a single input received from the reviewer, access information, associated with an individual user,
        receive input information from the reviewer selecting one or more of the batch processes,
        modify, based on performing the selected one or more batch processes, the access information, and
        produce a report related to the modified access information.

8. The managed service of claim 7, where the access information includes user information, system information, and access level information, and where the reviewer selects the one or more batch processes based on one or more of the user information, the system information, or the access level information.

9. The managed service of claim 7, where the device is further to:
generate, based on modifying the access information, a user email or a manager email based on a template, and
send the user email or the manager email to a recipient based on an instruction related to the reviewer.

10. The managed service of claim 7, where the reviewer is associated with a customer that subscribes to a managed service provided by the managed service.

11. The managed service of claim 7, where the device is further to:
send the report to an auditor that performs an audit on behalf of a customer associated with the plurality of system resources.

12. The managed service of claim 7, where the device is further to:
send the report to an agency associated with a customer associated with the access information.

13. A method comprising:
receiving, via a user interface, a request for at least one of user information, system information related to a particular system, or access level information related to a plurality of users of system resources, of the particular system, and corresponding user privileges associated with a particular system resource;
displaying, via the user interface, a plurality of selectable batch processes with respect to the user privileges corresponding to the at least one of the user information, the system information, or the access level information, where the plurality of selectable batch processes include:
a first process to revoke user privileges associated with a first set of users, of the plurality of users,
where the user privileges associated with the first set of users allow the first set of users to access the particular system resource,
where the first set of users are determined to be associated with a login identification and/or a login password, associated with the particular system, and not to be associated with any other identifying information for each of the first set of users, based on the at least one of the user information, the system information, or the access level information, and
where the first process is performed without performing a review of the at least one of user information, the system information, or the access level information associated with each user, of the first set users,
a second process to revoke user privileges associated with a second set of users, of the plurality of users,
where the user privileges associated with the second set of users allow the second set of users to access the particular system, and
where the second set of users are identified for disassociation from the particular system, by a system manager associated with the second set of users, without performing a review of the at least one of user information, the system information, or the access level information associated with each user, of the second set of users,
a third process to grant continued user privileges associated with a third set of users, of the plurality of users,
where granting the continued user privileges is based on existing privileges that are common to each user, of the third set of users, without performing a review of the at least one of user information, the system information, or the access level information associated with each user, of the third set of users, and
a fourth process to deny user privileges associated with an individual user, of the plurality of users, where the user privileges, associated with the individual user, are denied based on not being able to identify one or more of the user privileges associated with the individual user, and without performing a review of the at least one of user information, the system information, or the access level information associated with the particular user;
updating the at least one of the user information, the system information, or the access level information based on one or more of the batch processes selected by a reviewer; and
generating a report based on the updating.

14. The method of claim 13, further comprising:
receiving selection, of the one or more batch processes, from the reviewer via a radio button or a window in the user interface.

15. The method of claim 13, further comprising:
generating, based on the updating, a message for a particular user related to the user information or for the system manager, where the message informs the particular user or the system manager that the system information or the access level information related to the particular user has been reviewed.

16. The method of claim 15, further comprising:
performing the generating based on information received from the reviewer; and
sending the message to the particular user or to the system manager on behalf of the reviewer.

17. The method of claim 13, further comprising:
providing the report to an auditor associated with the particular system.

18. A system, comprising:
a processor;
a database module to:
store user information, system information, and access level information for each of a plurality of users associated with the system, and
store updated user information, updated system information, or updated access level information based on a review performed on behalf of a subscriber associated with the system;
an authorization module to:
authorize a reviewer, on behalf of the subscriber, to perform the review;
an interface module to:
accept a request, from the authorized reviewer, related to retrieving the user information, the system information, or the access level information,
display a plurality of selectable batch processes with respect to the retrieved user information, the retrieved system information, or the retrieved access level information via a browser, where the selectable batch processes include:
a first process to modify, based on a single input received from the reviewer, access level information associated with a first set of users, of the plurality of users, each of the first set of users currently being allowed access to a particular resource of the system via an associated having a login identification and/or a login password associated with user privileges for the particular resource and where the first access level information associated with the first set of users is modified based on a determination that each of the first set of users is not associated with information to determine an identity of the respective user of the first set of users, a second process to modify, based on a single input received from the reviewer, access level information associated with a second set of users, of the plurality of users, identified for disassociation from the system, by a system manager associated with the second set, a third process to approve, based on a single input received from the reviewer, access level information associated with a third set of users, of the plurality of users, based on existing privileges that are common to each user of the third set of users, and a fourth process to modify, based on a single input received from the reviewer, access level information associated with an individual user, of the plurality of users, generate the updated system information or the updated access level information based on one or more of the selectable batch processes selected by the reviewer during the review, provide the updated system information or the updated access information to the database module, and generate a report on behalf of the subscriber.

19. The system of claim 18, further comprising:

an email module to:

generate a message based on an instruction related to the updated user information, the updated system information, or the updated access information, where the message includes content that notifies a recipient regarding the review.

20. The system of claim 18, where the authorization module is further to:

authorize an auditor to perform audit activity associated with the system.

21. The system of claim 20, where the interface module makes the report available to the auditor.

* * * * *